US006921796B2

(12) United States Patent
Hetherington

(10) Patent No.: US 6,921,796 B2
(45) Date of Patent: Jul. 26, 2005

(54) FLUOROELASTOMER COMPOSITIONS, THEIR PREPARATION, AND THEIR USE

(75) Inventor: Ray Hetherington, Virginia Beach, VA (US)

(73) Assignee: Illinois Tool Works, Inc., Glenview, IL (US)

( * ) Notice: Subject to any disclaimer, the term of this patent is extended or adjusted under 35 U.S.C. 154(b) by 133 days.

(21) Appl. No.: 10/440,168

(22) Filed: May 19, 2003

(65) Prior Publication Data

US 2004/0024133 A1 Feb. 5, 2004

Related U.S. Application Data

(60) Provisional application No. 60/447,290, filed on Feb. 14, 2003, provisional application No. 60/412,557, filed on Sep. 23, 2002, and provisional application No. 60/398,713, filed on Jul. 29, 2002.

(51) Int. Cl.[7] .................................................. C08F 8/08
(52) U.S. Cl. ................................. 525/326.3; 525/384
(58) Field of Search .............................. 525/326.3, 384

(56) References Cited

U.S. PATENT DOCUMENTS

| | | | |
|---|---|---|---|
| 4,272,179 A | 6/1981 | Seanor |
| 4,489,196 A | 12/1984 | Schmiegel |
| 4,758,647 A | 7/1988 | Niwa et al. |
| 4,831,083 A | 5/1989 | Geri et al. |
| 4,900,781 A | 2/1990 | Hirai et al. |
| 5,177,148 A | 1/1993 | Arcella et al. |
| 5,218,026 A | 6/1993 | Toda et al. |
| 5,374,484 A | 12/1994 | Kasahara et al. |
| 5,412,034 A | 5/1995 | Tabb |
| 5,548,028 A | 8/1996 | Tabb |
| 5,589,559 A | 12/1996 | Saito et al. |
| 5,776,294 A | 7/1998 | Nagel |
| 6,020,440 A | 2/2000 | Tabb |
| 6,074,698 A | 6/2000 | Sakurai et al. |
| 6,132,479 A | 10/2000 | Welstand et al. |
| 6,221,971 B1 | 4/2001 | Tabb |
| 6,228,943 B1 | 5/2001 | Morikawa et al. |
| 6,300,421 B1 | 10/2001 | Blok et al. |
| 6,310,141 B1 | 10/2001 | Chen et al. |
| 6,326,436 B2 | 12/2001 | Bowers |
| 6,352,488 B1 | 3/2002 | Morris et al. |
| 6,369,130 B1 | 4/2002 | Zolotnitsky et al. |
| 6,372,833 B1 | 4/2002 | Chen et al. |
| 6,395,834 B1 | 5/2002 | Albano et al. |
| 6,395,848 B1 | 5/2002 | Morgan et al. |
| 6,399,729 B1 | 6/2002 | Farnham et al. |
| 6,416,834 B1 | 7/2002 | Fuller |
| 6,447,916 B1 | 9/2002 | Van Gool |
| 6,512,032 B1 | 1/2003 | Ohira et al. |
| 6,538,069 B2 | 3/2003 | Faulkner |
| 2001/0000343 A1 | 4/2001 | Bowers |
| 2002/0099142 A1 | 7/2002 | Faulkner |

FOREIGN PATENT DOCUMENTS

| | | |
|---|---|---|
| DE | 19848141 | 10/1998 |
| EP | 0 544 265 | 6/1993 |
| EP | 0 739 688 A2 | 10/1996 |
| EP | 0 739 688 B1 | 10/1996 |
| EP | 0 739 688 A3 | 10/1996 |
| EP | 1 386 943 | 2/2004 |
| JP | 53041353 | 4/1978 |
| JP | 07-316376 | 12/1995 |
| JP | 2000 034 379 | 2/2000 |
| WO | WO 02/092683 | 11/2002 |
| WO | WO 02/092687 | 11/2002 |

OTHER PUBLICATIONS

H. Ehrend, "Special elastomers and processing promoters", Gummi, Fasern, Kunststoffe (1991), Abstract.
R. Ferro, et al., "Extruding fluroelastomers to meet high performance needs", Part II, Elastomerics (1989), Abstract.
J. H. Brown, "Developments In Viton Fluoroelastomers", SGF Publicerande, (1974), Abstract.
S. O'Rourke, (C. P. Hall Co.), High Performance plasticisers for all types of rubber, Industria della Gomma 46, No. 5, Jun. 2002, Abstract.
S. O'Rourke, (C. P. Hall Co.), "Filling the need for HP ester plasticizers", Rubber and Plastics News, Mar. 11, 2002.
Viton® Fluoroelastomer Technical Literature, "Mold Ex Rubber Co. CB200–X4–Conductive Compound of Viton® for low perm F200 Barrier Hose", 1995.
S. O'Rourke, "Plastificanti Per Gomma Ad Alte Prestazioni", L'Industria Della Gomma 443.
R. Stevens, "Ingredients for Hypalon® for Boeing Hose", DuPont Dow Elastomers, (1999).
Ron Stevens, Dupont Dow Elastomers Memo re: Ingredients for Hypalon® for Boeing Hose, dated Dec. 16, 1999.
Bob Fuller, Dupont, letter dated Nov. 8, 1995, to Bruce Guy, Mold–Ex Rubber Co.

*Primary Examiner*—Bernard Lipman
(74) *Attorney, Agent, or Firm*—Millen, White, Zelano, Branigan, P.C.

(57) ABSTRACT

A curable fluoroelastomer composition comprising at least one fluoroelastomer, a bisphenol curative, and a peroxide curative provides a non-post cure flurorelastomer material suitable for use in the manufacture of, for example. When cured (vulcanized), the composition exhibits an improved compression set resistance, in comparison to the fluoroelastomer cured by the bisphenol curative alone, without performing a post-cure procedure.

29 Claims, 2 Drawing Sheets

FLUOROELASTOMER COMPOSITIONS, THEIR PREPARATION, AND THEIR USE

This application claims benefit of U.S. Provisional Application Ser. No. 60/398,713, filed Jul. 29, 2002, U.S. Provisional Application Ser. No. 60/412,557, filed Sep. 23, 2002, and U.S. Provisional Application Ser. No. 60/447,290, filed Feb. 14, 2003, the entire disclosures of which are hereby incorporated by reference

FIELD OF THE INVENTION

The invention relates to curable and cured fluoroelastomers and molded products made therefrom, particularly sealing elements such as gaskets used in the automotive industry.

BACKGROUND OF THE INVENTION

Reducing the emissions of pollutants caused by the operation of internal combustion engines is a continuing goal of industry in general, and the automotive industry in particular. Developments in this area have been spurred on in part by federal and state legislations which set limits for the permissible levels of numerous gasses and other pollutants that result from internal combustion engines such as the gasoline burning engines used in automobiles. For example, California's Air Resources Board (ARB) adopted Low-Emission Vehicle (LEV) regulations in 1990. This set of regulations requires significant reductions in automobile emissions and run from 1994 to 2003. The ARB has since amended these regulations to impose even greater emission reduction requirements. These new regulations, LEV-II, will run from 2004 through 2010. LEV and LEV-II impose very stringent requirements on emissions from automobiles. Other relevant regulations are the U.S. Environmental Protection Agency National Low Emissions Vehicle (NLEV) standards. As a result, the automotive industry is continuously investigating ways to reduce emissions in order to comply with these and other legislative requirements.

Emissions from internal combustion engines include not only the resultant combustion gases, such as carbon monoxide, but also fuel emissions, e.g., the leakage of fuel vapors as the fuel, e.g., gasoline, is transported from the storage vessel to the point of combustion. To reduce such emissions, gaskets and other sealing elements are used to seal joints. Such sealing elements are made from a variety of materials including polymers, fiber composites, graphite, and steel. Typical polymeric gasket materials used in automobiles include silicone rubbers, fluorosilicone rubbers, and HNBR rubber (hydrogenated acrylonitrile-butadiene rubber or hydrogenated nitrile rubber).

However, due to the demand for even lower emission levels, polymeric materials that exhibit even lower permeability to fuel vapors are being used, for example, fluoroelastomers (FKM). Typical examples of fluoroelastomers are copolymers of vinylidene fluoride and hexafluoropropylene and terpolymers of vinylidene fluoride, hexafluoropropylene and tetrafluoroethylene. These fluoroelastomers possess not only low fuel permeability, but also excellent heat stability, good resistance to solvents, oils, and other chemicals, low compression set, and good processability. However, fluoroelastomers are relatively expensive materials, and thus there is a need to reduce costs associated with the manufacture of molded articles such as gaskets from fluoroelastomers.

In the manufacture of molded articles from fluoroelastomers, a two step curing or vulcanization process is typically used. First, the articled is molded and undergoes an initial "within the mold" cure induced by the application of heat and pressure. Subsequently, the molded article undergoes a post cure step wherein the article is heated to, for example, 225° C.–250° C. and held at that temperature for a period of time, e.g., from about 12 up to 16 hours, or even up to 24 hours, sometimes even up to 48 hours.

This post-cure procedure greater increases production time and costs. For this reason, the industry has sought curable fluoroelastomer compositions that exhibit low-post cure. One such material is Technoflon FOR HS® sold by Ausimont USA, which is said to provide a 75% reduction in post cure rate. This material is a 66% fluorine fluorocarbon elastomer combined with a bisphenol curative. In this material, hygroscopic end groups are eliminated in the polymer backbone which results in improved compression set because the ionic forces of the end groups, which tend to adversely affect compression set, are mitigated. While this material does exhibit shorter post cure times, there is still a need for materials with even lower post cure times, more particularly there is a need for materials that can be characterized as non-post cure materials.

SUMMARY OF THE INVENTION

Accordingly, an aim of the invention is to provide a curable fluoroelastomer composition containing a cure system that results in a reduced post cure time. Preferably, the inventive fluoroelastomer composition does not require any post cure procedure.

Upon further study of the specification and appended claims, further advantages of this invention will become apparent to those skilled in the art.

In accordance with the invention there is provided a curable fluoroelastomer composition comprising at least one fluoroelastomer, a bisphenol curative, and a peroxide curative, wherein when cured (vulcanized) the material exhibits an improved compression set resistance, in comparison to the fluoroelastomer cured by the bisphenol curative alone, without performing a post-cure procedure.

In accordance with another aspect of the invention there is provided a curable fluoroelastomer composition comprising at least one fluoroelastomer, a bisphenol curative, and a peroxide curative, wherein during curing the bisphenol curative provides an initial cross-linking and thereafter the peroxide curative deactivates the bisphenol curative and provides a secondary cross-linking. The resultant cured material exhibits an improved compression set resistance, in comparison to the fluoroelastomer cured by the bisphenol curative alone, without performing a post cure procedure.

In accordance with another aspect of the invention there is provided a curable fluoroelastomer composition comprising at least one fluoroelastomer, a bisphenol curative, and a peroxide curative, wherein when cured the material exhibits a higher degree of cross-linking, in comparison to fluoroelastomer cured by the bisphenol curative alone, without performing a post cure procedure.

In accordance with another aspect of the invention there is provided a curable fluoroelastomer composition comprising at least one fluoroelastomer, a bisphenol curative, and a peroxide curative, wherein during curing the bisphenol curative provides an initial cross-linking and thereafter the peroxide curative deactivates the bisphenol curative and provides a secondary cross-linking. The resultant cured material exhibits a higher degree of cross-linking, in comparison to fluoroelastomer cured by the bisphenol curative alone, without performing a post cure procedure.

While not being bound to any particular theory as to the mechanism involved, it is believed that the two curative components provide a two stage cure. In the initial stage, the bisphenol provides a first level or primary cross-linking. During this stage, cross-linking from the peroxide is not believed to be substantial. Near the end of this initial stage, the rate of cross-linking from the bisphenol curative decreases. The second cure stage then starts. In this stage, it is believed that the peroxide cure neutralizes or deactivates the bisphenol cure and provides a secondary cross-linking reaction. Deactivation of the bisphenol curative prevents additional primary cross-linking under compression which can lead to poor compression set characteristics. Alternatively or, in addition, the peroxide may act in conjunction with the bisphenol and/or act as an $H_2O$ scavenger to eliminate the ionic effects of $H_2O$ on the fluoroelastomer polymer chain, thereby eliminating the need to perform a post cure. In any event, the procedure provides a cured fluoroelastomer having a higher degree of cross-linking and a markedly improved compression set resistance without performing a traditional post cure step of heating (for example, heating to about 225° C. for about 12 to 16 hours).

In accordance with a further aspect of the invention, a monomeric ester plasticizer is added to the curable fluoroelastomer composition which comprises at least one fluoroelastomer, a bisphenol curative, and a peroxide curative. The plasticizer reduces the viscosity of the composition thereby facilitating molding. In addition, the resultant molded composition exhibits improved low temperature retraction. In this embodiment, it is preferred that the peroxide curative is in liquid form and that the plasticizer and peroxide are added together to the fluoroelastomer composition.

Through the use of the inventive curable fluoroelastomer composition, the manufacturing process is simplified by eliminating the post cure manufacturing step. This, of course, results in lower manufacturing costs and reduces the manufacturing time. In addition, by eliminating the post-cure step, the manufacturing process moves further towards a continuous process, and away from a batch process, which increases efficiency and production rate.

The inventive composition is particularly useful for the manufacture of sealing elements like O-rings, flange seals and gaskets, e.g., intake manifold gaskets, rocker cover gaskets, oil pan gaskets, plastic carrier gaskets, rubber to metal bonded gaskets, and the like. The materials are especially well suited for use as gaskets that require low fuel permeation.

In accordance with a particular embodiment, the inventive composition is used to manufacture intake manifold gaskets which seal the joint between the intake manifold and the cylinder head of the engine. Such gaskets can be manufactured separately (so-called "press-in-place" gaskets) or can be molded onto a carrier. In the latter case, the inventive composition provides a further advantage. In prior gasket materials that required a traditional post-cure step, the carrier onto which the gasket is molded had to be constructed from materials that could withstand the post cure temperatures. For this reason, the carriers used were often made form expensive heat resistant materials such as polyamide (PA) 6/6. However, with the materials according to the invention, less expensive, lower heat resistant materials (e.g., materials with a Tg (glass transition temperature) of around 200° C. or less, such as 150° C. to 200° C.) can be used for the carrier such as PA 4/6 and polyether sulfone. This results in further reductions in manufacturing costs.

The fluoroelastomers suitable for use in the disclosed invention are elastomers that comprise one or more vinylidene fluoride units ($VF_2$ or VdF), one or more hexafluoropropylene units (HFP), one or more tetrafluoroethylene units (TFE), one or more chlorotrifluoroethylene (CTFE) units, and/or one or more perfluoro(alkyl vinyl ether) units (PAVE) such as perfluoro(methyl vinyl ether) (PMVE), perfluoro(ethyl vinyl ether)(PEVE), and perfluoro (propyl vinyl ether)(PPVE). These elastomers can be homopolymers or copolymers. Particularly suitable are fluoroelastomers containing vinylidene fluoride units, hexafluoropropylene units, and, optionally, tetrafluoroethylene units and fluoroelastomers containing vinylidene fluoride units, perfluoroalkyl perfluorovinyl ether units, and tetrafluoroethylene units. Especially suitable are copolymers of vinylidene fluoride and hexafluoropropylene units.

If the fluoropolymers contain vinylidene fluoride units, preferably the polymers contain up to 40 mole % VF2 units, e.g., 30–40 mole %. If the fluoropolymers contain hexafluoropropylene units, preferably the polymers contain up to 70 mole % HFP units. If the fluoropolymers contain tetrafluoroethylene units, preferably the polymers contain up to 10 mole % TFE units. When the fluoropolymers contain chlorotrifluoroethylene preferably the polymers contain up to 10 mole % CTFE units. When the fluoropolymers contain perfluoro(methyl vinyl ether) units, preferably the polymers contain up to 5 mole % PMVE units. When the fluoropolymers contain perfluoro(ethyl vinyl ether) units, preferably the polymers contain up to 5 mole % PEVE units. When the fluoropolymers contain perfluoro(propyl vinyl ether) units, preferably the polymers contain up to 5 mole % PPVE units. The fluoropolymers preferably contain 66%–70% florine.

The viscosity of the fluoropolymers can vary. Preferably, the fluoropolymers have a Mooney viscosity of 20–40.

These polymers have a certain amount of iodine and/or bromine (e.g., 0.01–5 wt %) for use with peroxide cures.

One suitable commercially available fluoroelastomer is Technoflon FOR HS® sold by Ausimont USA. This material contains Bisphenol AF, manufactured by Halocarbon Products Corp. Another commercially available fluoroelastomer is Viton® AL 200, by DuPont Dow, which is a terpolymer of VF2, HFP, and TFE monomers containing 67% fluorine. Another suitable commercially available fluoroelastomer is Viton® AL 300, by DuPont Dow. A blend of the terpolymers Viton® AL 300 and Viton® AL 600 can also be used (e.g., one-third AL-600 and two-thirds AL-300).

The bisphenol curing agent provides crosslinking through basic nucleophile (nucleophilic addition) curing. The bisphenol is used in conjunction with an accelerator, such as an organophosphonium salt. See, e.g., U.S. Pat. No. 4,272, 179 and "Viton Fluoroelastomer Crosslinking by Bisphenols," W. W. Schmiegel, South German Meeting of Deustche Kaustschuck Und Gummi Gesellschaft, Apr. 28–29, 1977. In nucleophilic addition, the bisphenol curing agent forms a covalently crosslinked network as a result of heating following basic dehydrofluorination.

Bisphenol curing agents that can be used in the invention are those known within the art as being suitable for use with fluoroelastomers. See, e.g., U.S. Pat. No. 6,239,469. In general, the bisphenol crosslinking agent is used in amounts of from about 0.5–4 parts by weight per hundred parts by weight fluoroelastomer (phr), preferably 1–2.5 phr.

Suitable bisphenols include those disclosed by U.S. Pat. No. 6,239,469, i.e., bisphenols of the formula:

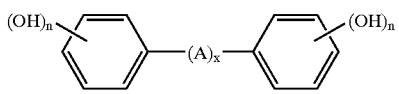

wherein

A is a stable divalent radical, such as a difunctional aliphatic, cycloaliphatic, or aromatic radical, in each case having up to 1–13 carbon atoms, or a thio, oxy, carbonyl, sulfinyl, or sulfonyl radical, and A is optionally substituted with at least one chlorine or fluorine atom;

x is 0 or 1;

n is 1 or 2; and any aromatic ring of the polyhydroxylic compound is optionally substituted with at least one atom of chlorine, fluorine, bromine, —CHO, or a carboxyl or acyl radical (e.g., —COR wherein R is OH, $C_{1-8}$-alkyl, aryl, or cycloalkyl). Combinations of two or more such bisphenol compounds can also be used.

Suitable A groups are alkylene, alkylidene, cycloalkylene, and arylene groups, for example, methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, hexamethylene, ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, 1,1-cyclohexylidene, 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, cycloheptylene, m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, and 2,6-naphthylene.

To provide for the vulcanization/curing in accordance with the invention, the peroxides are preferably high temperature peroxides, that is they have a slower decomposition half life. The use of such peroxides permits the bisphenol curing reactions to proceed for a sufficient amount of time before the peroxide cure begins. This prevents the occurrence of competing curing reaction which can result in unsatisfactory or even un-useable materials. For example, tests with valerate peroxide and dicumyl peroxide on certaine fluoroelastomer/bisphenol composition were unsuccessful (Technoflon FOR HS® and is Viton® AL 200). These two peroxides have faster half life decompositions and start curing at around 88 to 116° C. Thus, these peroxides may be unsuitable unless used with a bisphenol cure that has a fast reaction rate. Preferably, the peroxides for use in the invention start curing at temperatures of about 170° C.–180° C.

The amount of peroxide cure to be used can vary and optimal amounts can be determined through routine experimentation. In general, about 0.05–5 phr (parts per hundred parts by weight of fluoroelastomer) of peroxide are used, preferably 0.1 to 3 parts by weight phr. While typically only one peroxide is used, it is also possible to combine more than one peroxide. The peroxide may be adsorbed on an inert carrier, the weight of which is not included in the above mentioned range for the amount of peroxide. In the case of Perkadox® 14/40, the amount of this peroxide cure is preferably 1±0.3% of the total weight of the composition. In the case of Varox® DBPH (liquid form), the amount of this peroxide cure is preferably 0.75–2% of the total weight of the composition.

Peroxides useful as curing agents in the practice of the present invention include tert-butylcumyl peroxide (e.g., Trigonox® T), 2,5-dimethyl-2,5-di-(tert-butylperoxy) hexane (e.g., Trigonox® 101), alpha,alpha-bis(tert-butylperoxy-isopropyl)benzene (Perkadox® 14/40 and Perkadox® 14 (without carrier)), and 2,5-dimethyl-2,5-di(t-butyl-peroxy)hexane (Varox® DBPH-50 or Varox® DBPH (liquid form)). Another suitable peroxide is 25 Tri DYBP (with or without carrier).

The addition of a monomeric ester plasticizer to the curable fluoroelastomer composition can provide advantageous results with regards to viscosity and low-temperature properties. The amount of plasticizer used is preferably 3 to 7 per 100 parts of the fluoroelastomer, especially 4 to 6 per 100 parts of the fluoroelastomer. A preferred plasticizer is pentaerythritol ester (e.g., Hercoflex 600) [Hercules, Aqualon Division]. In a preferred embodiment, pentaerythritol ester is used in combination with and 2,5-dimethyl-2,5-di(t-butyl-peroxy)hexane (Varox® DBPH in liquid form).

The use of a plasticizer, for example, Hercoflex 600 in combination with Varox® DBPH in liquid form, is believed to enhance the penetration and distribution of the peroxide into the fluoroelastomer. Preferably, the peroxide is dissolved into the plasticizer and then combined with the fluoroelastomer.

A co-vulcanizing agent can be used in combination with the peroxide. Examples of co-vulcanizing agents include triallyl cyanurate, trimethally isocyanurate, triallyl isocyanurate (TAIC), triacrylformal, triallyl trimellitate, N,N'-m-phenylenebismaleimide, diallyl phthalate, tetrallylterephthalamide, tris(diallylamine)-s-triazine, triallyl phosphate, N,N,N',N'-tetrallyl-malonamide; trivinyl-isocyanurate; 2,4,6-trivinyl-methyltrisiloxane; N,N'bisallylbicyclo-oct-7-ene-disuccini-mide (BOSA), and N,N-diallylacrylamide. Generally, the co-vulcanizing agent is used in an amount of 0.1 to 10 parts by weight per 100 parts by weight of the fluoroelastomer.

In additional to the above described components, the compositions according to the invention can optionally contain additives conventionally used in elastomeric compositions, e.g., activators, fillers, dyes/coloring agents/pigments, release agents, metal compounds, lubricants, retarding agents, thickeners, antioxidants, stabilizers, plasticizers, processing aids, etc. For example, the composition can contain up to up to about 50% of one or more fillers, up to about 10% of one or more activators, up to about 1.5% of one or more dyes/coloring agents/pigments, and/or up to about 0.3% of one or more release agents.

Suitable fillers include carbon black, graphite, silica, clay, diatomaceous earthy, talc, wollastonite calcium carbonate, calcium silicate, calcium fluoride, barium sulfate, and the like. These fillers can be used alone or in combination. Typical coloring agents include titanium oxide, iron oxide, and the like. These can be present in amounts up to 10% by weight.

The compositions according to the invention can be prepared by combining the components, elastomer, bisphenol curative, peroxide curative and optional additives, for example, by Banbury mixer or pressure kneader. The resultant composition is then molded (compression molded, transfer injection molding, injection molding, etc.) and subjected to heat and pressure to perform the primary curing (vulcanization), i.e., subjected to a temperature of about 175 to 200° C. and a pressure of about 10,000 to 20,000 psi for about 140 to 240 minutes. As noted above, a secondary vulcanization or post-cure is not necessary.

In the foregoing and in the following examples, all temperatures are set forth uncorrected in degrees Celsius; and, unless otherwise indicated, all parts and percentages are by weight.

The entire disclosure of all applications, patents and publications, cited above and below, is hereby incorporated by reference.

BRIEF DESCRIPTION OF THE DRAWINGS

Various other features and attendant advantages of the present invention will be more fully appreciated as the same becomes better understood when considered in conjunction with the accompanying drawings wherein.

EXAMPLES

Example 1

Figure 1:
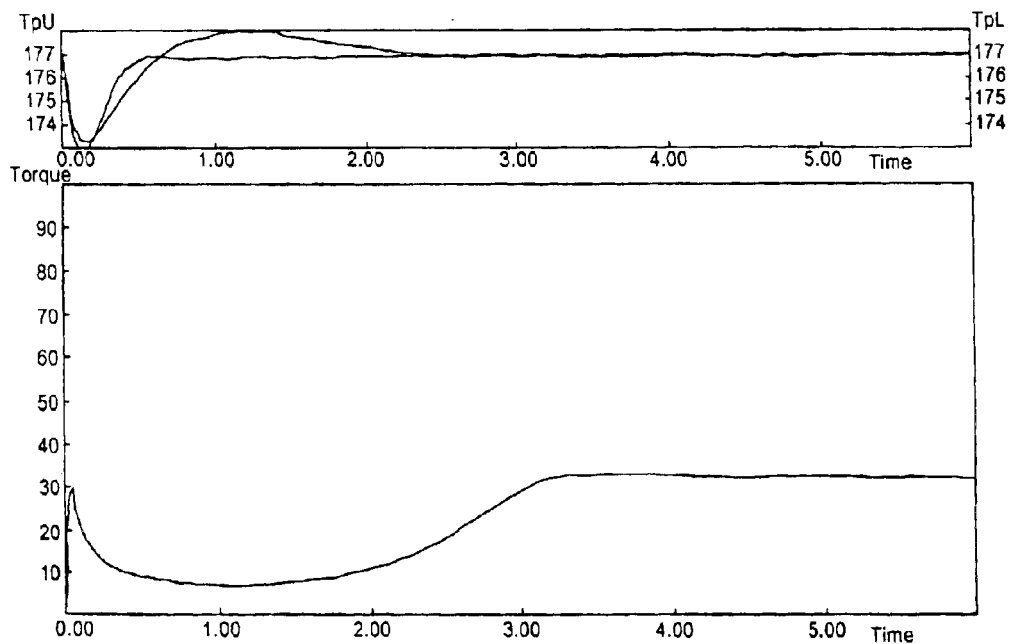
FIG. 1 shows the graph of time versus torque for the unmodified sample (Technoflon® FOR HS without peroxide) and FIG. 2 shows the time versus torque graph for the material in accordance with the invention (Technoflon® FOR HS with the peroxide Perkadox® 14/40).
Figure 2:
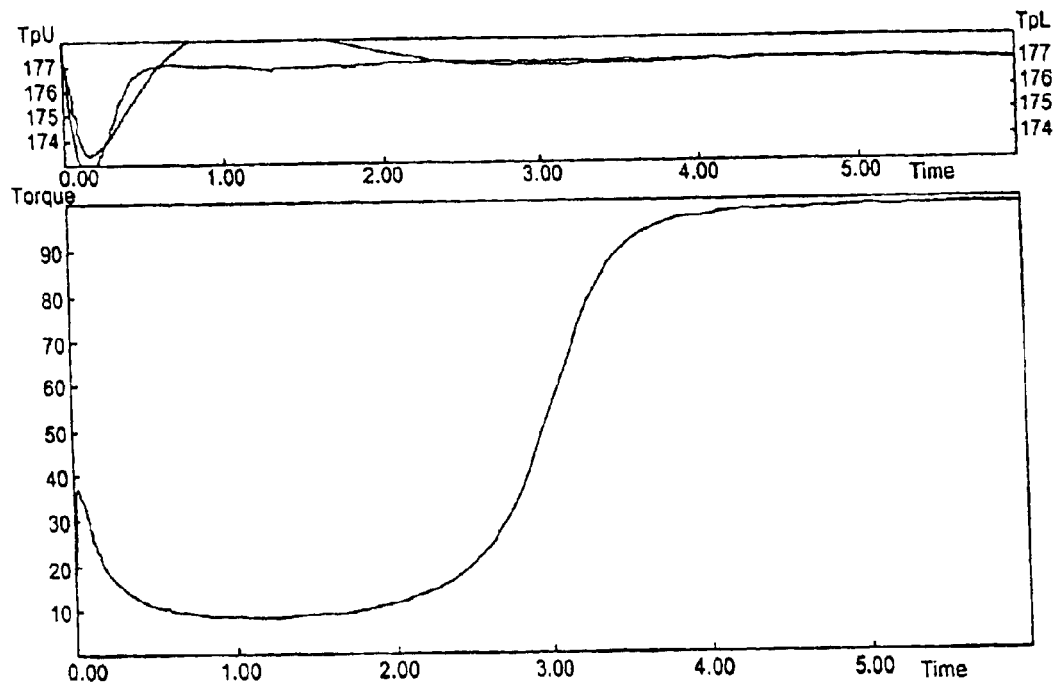

The following components are combined to form the masterbatch:

|    | Masterbatch                                              | grams |
|----|----------------------------------------------------------|-------|
| 1) | 66% fluorine copolymer with bisphenol cure incorporated[1] | 100   |
| 2) | Magnesium oxide (activator)                              | 9     |
| 3) | Barium sulfate (filler)                                  | 65    |
| 4) | Stan Tone D 4005 blue (dye)                              | 2     |
| 5) | Strutkol WS 280 (release aid)                            | 0.5   |
|    |                                                          | 176.5 |

[1]Technoflon ® FOR HS, Ausimont USA.

To this masterbatch is added 0.6±0.2 gm of 40% active bis(t-butylperoxy-isopropyl)benzene on a clay carrier (Perkadox® 14/40, from Akzo Chemicals) to provide a total weight of 177.1 gm.

The components can be combined as follows: The FKM polymer is introduced into a mixer and stirred for about 1 minute. Then, the filler is added and the mixture is stirred for about three minutes. Next, the dye, release aid, and peroxide are added and stirred for about a minute. The batch is removed from the mixer after a total mixing time of about 5 to 6 minutes at a temperature of 230F–235° F.

The materials were tested as follows. ASTM slabs were prepared per ASTM D2000. Compression set samples were prepared per (ISO 815/ASTM D395), and plied button compressed 25% tested 22 hours at 175° C. The results were as follows: the peroxide modified material in accordance with the invention yielded 25–30% compression set, whereas the unmodified control yielded 65–70% compression set.

Example 2

The procedure of Example 1 is followed in general except that the FKM polymer used is a blend of the terpolymers Viton® AL 300 and Viton® AL 600 (one-third AL-600 and two-thirds AL-300) (manufactured by Dupont-Dow) which has an incorporated bisphenol cure. The peroxide used is 2,5-dimethyl-2,5-di(t-butyl-peroxy)hexene (Varox® DBPH-50, manufactured by R. T. Vanderbilt Co.). In this embodiment, improved results are obtained when using barium sulfate as a filler (e.g., 20 parts+/−5 parts per hundred parts polymer) and red iron oxide as a pigment (e.g., 4 parts+/−1 parts per hundred parts polymer).

Example 3

The following components are combined to form the masterbatch:

|    | Masterbatch                                              | grams |
|----|----------------------------------------------------------|-------|
| 1) | 66% fluorine copolymer with bisphenol cure incorporated[1] | 100   |
| 2) | Magnesium oxide (activator)                              | 9     |
| 3) | Barium sulfate (filler)                                  | 65    |
| 4) | Stan Tone D 4005 blue (dye)                              | 2     |
| 5) | Strutkol WS 280 (release aid)                            | 0.5   |
|    |                                                          | 176.5 |

[1]FKM polymer used is a blend of the terpolymers Viton ® AL 300 and Viton ® AL 600 (one-third AL-600 and two-thirds AL-300) (manufactured by Dupont-Dow) which has an incorporated bisphenol cure.

To this masterbatch is added 1±0.5 gm of liquid 2,5-dimethyl-2,5-di(t-butyl-peroxy)hexene (Varox® DBPH, manufactured by R. T. Vanderbilt Co.) and added 5±1 gm of pentaerythritol ester (Hercoflex 600) to provide a total weight of 182.5 gm.

The FKM polymer is introduced into a mixer and stirred for about 1 minute. Then, the filler is added and the mixture is stirred for a about three minutes. Next, the dye, release aid, peroxide and plasticizer are added and stirred for about a minute. The batch is removed from the mixer after a total mixing time of about 5 to 6 minutes at a temperature of 230° F.–235° F.

The material was tested for low-temperature retraction, an indication of glass transition temperature, in accordance with ASTM D1329-88, which measures the rapid evaluation of crystallization effects and compares viscoelastic rubber materials at low temperatures.

As a result of the addition of the plasticizer, compound viscosity was reduced from 24,670 centipoise to 1,851 centipoise. This significant viscosity drop allowed the compound to be molded onto a nylon 6,6 carrier (GM aftermarket 3.1L IMG). The composition released very well from the mold a produced functional prototype samples.

The TR-10 (low temperature retraction) was tested in which the modification produced a significant improvement from −19° C. to −25° C. Moreover, the physical properties are more consistent due to the enhanced dispersion of the peroxide.

Example 4

The procedure of Example 3 is followed in general except that the FKM polymer used is Technoflon FOR HS® sold by Ausimont USA, i.e., a 66% fluorine fluorocarbon elastomer combined with a bisphenol curative. The peroxide is 2,5-dimethyl-2,5-di(t-butyl-peroxy)hexene in liquid form (Varox® DBPH, manufactured by R. T. Vanderbilt Co.) and the plasticizer is pentaerythritol ester (Hercoflex 600).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A curable fluoroelastomer composition comprising:
   a elastomeric component consisting essentially of one or more fluoroelastomers,
   at least one bisphenol curative,
   at least one peroxide curative, and
   a monomeric ester plasticizer,
   wherein said one or more fluoroelastomers is a homopolymer or a copolymer in which the monomer units are selected from vinylidene fluoride, hexafluoropropylene, tetrafluoroethylene, chlorotrifluorethylene, and perfluoro (alkyl vinyl ether).

2. A curable fluoroelastomer composition according to claim 1, wherein said perfluoro(alkyl vinyl ether) units are selected from perfluoro(methyl vinyl ether)(PMVE), perfluoro(ethyl vinyl ether)(PEVE), and perfluoro(propyl vinyl ether)(PPVE) units.

3. A curable fluoroelastomer composition according to claim 1, wherein said one or more fluoroelastomers contains vinylidene fluoride units, hexafluoropropylene units, and, optionally, tetrafluoroethylene units.

4. A curable fluoroelastomer composition according to claim 1, wherein said one or more fluoroelastomers contains vinylidene fluoride units, perfluoroalkyl perfluorovinyl ether units, and tetrafluoroethylene units.

5. A curable fluoroelastomer composition according to claim 1, wherein said one or more fluoroelastomers is a copolymer of vinylidene fluoride and hexafluoropropylene units.

6. A curable fluoroelastomer composition according to claim 1, wherein said one or more fluoroelastomers is a terpolymer of vinylidene fluoride, hexafluoropropylene, and tetrafluoroethylene monomers.

7. A curable fluoroelastomer composition according to claim 6, wherein said one or more fluoroelastomers contains 66–70% fluorine.

8. A curable fluoroelastomer composition according to claim 6, wherein said composition contains said bisphenol in an amount of 0.5–4 parts by weight per hundred parts by weight fluoroelastomer.

9. A curable fluoroelastomer composition according to claim 8, wherein said composition contains said bisphenol in an amount of 1–2.5 parts by weight per hundred parts by weight fluoroelastomer.

10. A curable fluoroelastomer composition according to claim 1, wherein said bisphenol is of the formula:

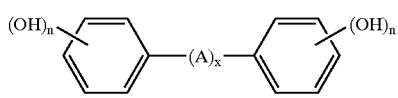

wherein
A is a stable divalent aliphatic, cycloaliphatic, or aromatic radical, in each case having up to 1–13 carbon atoms, or a thio, oxy, carbonyl, sulfinyl, or sulfonyl radical, and A is optionally substituted with at least one chlorine or fluorine atom;
x is 0 or 1;
n is 1 or 2; and
any aromatic ring of the polyhydroxylic compound is optionally substituted with at least one atom of chlorine, fluorine, bromine, —CHO, or a carboxyl or acyl radical.

11. A curable fluoroelastomer composition according to claim 10, wherein A is an alkylene, alkylidene, cycloalkylene, or arylene group.

12. A curable fluoroelastomer composition according to claim 11, wherein A is methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, hexamethylene, ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, 1,1-cyclohexylidene, 1,4-cyclohexylene, 2-chloro-1,4-cyclohexylene, 2-fluoro-1,4-cyclohexylene, 1,3-cyclohexylene, cyclopentylene, chlorocyclopentylene, fluorocyclopentylene, cycloheptylene, m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, or 2,6-naphthylene.

13. A curable fluoroelastomer composition according to claim 1, wherein said peroxide starts curing at 170° C.–180° C.

14. A curable fluoroelastomer composition according to claim 1, wherein the amount of peroxide cure is 0.05–5 parts per hundred parts by weight of fluoroelastomer.

15. A curable fluoroelastomer composition according to claim 14, wherein the amount of peroxide cure is 0.1 to 3 parts per hundred parts by weight of fluoroelastomer.

16. A curable fluoroelastomer composition according to claim 1, wherein the peroxide is tert-butylcumyl peroxide, alpha,alpha-bis(tert-butylperoxy-isopropyl)benzene, or 2,5-dimethyl-2,5-di(t-butyl-peroxy)hexane.

17. A curable fluoroelastomer composition according to claim 1, wherein the amount of monomeric ester plasticizer is 3 to 7 per 100 parts of the fluoroelastomer.

18. A curable fluoroelastomer composition according to claim 17, wherein the amount of monomeric ester plasticizer is 4 to 6 per 100 parts of the fluoroelastomer.

19. A curable fluoroelastomer composition according to claim 1, wherein the monomeric ester plasticizer is pentaerythritol ester.

20. A curable fluoroelastomer composition according to claim 1, further comprising a co-vulcanizing agent selected from triallyl cyanurate, trimethally isocyanurate, triallyl isocyanurate (TAIC), triacrylformal, triallyl trimellitate, N,N'-m-phenylenebismaleimide, diallyl phthalate, tetrallylterephthalamide, tris(diallylamine)-s-triazine, triallyl phosphate, N,N,N',N'-tetrallyl-malonamide; trivinyl-isocyanurate; 2,4,6-trivinyl-methyltrisiloxane; N,N'bisallylbicyclo-oct-7-ene-disuccinimide (BOSA), and N,N-diallylacrylamide.

21. A curable fluoroelastomer composition according to claim 20, wherein said co-vulcanizing agent is used in an amount of 0.1 to 10 parts by weight per 100 parts by weight of the fluoroelastomer.

22. A curable fluoroelastomer composition according to claim 1, further comprising one or more activators, fillers, dyes, coloring agents, pigments, release agents, metal compounds, lubricants, retarding agents, thickeners, antioxidants, stabilizers, plasticizers, processing aids, or combinations thereof.

23. A curable fluoroelastomer composition according to claim 22, wherein said composition contains up to up to about 50% of one or more fillers, up to about 10% of one or more activators, up to about 1.5% of one or more dyes/coloring agents/pigments, and/or up to about 0.3% of one or more release agents.

24. A curable fluoroelastomer composition according to claim 1, wherein:
said one or more fluoroelastomers comprises a copolymer of vinylidene fluoride and hexafluoropropylene units, a terpolymer of VF2, HFP, and TFE monomers, or combinations thereof, and said one or more fluoroelastomer contains 66–70% fluorine;
said a bisphenol curative is present in an amount of 0.5–4 parts by weight per hundred parts by weight fluoroelastomer, wherein said bisphenol of the formula

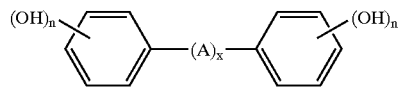

wherein
A is methylene, ethylene, chloroethylene, fluoroethylene, difluoroethylene, 1,3-propylene, 1,2-propylene, tetramethylene, chlorotetramethylene, fluorotetramethylene, trifluorotetramethylene, 2-methyl-1,3-propylene, 2-methyl-1,2-propylene, pentamethylene, hexamethylene, ethylidene, dichloroethylidene, difluoroethylidene, propylidene, isopropylidene, trifluoroisopropylidene, hexafluoroisopropylidene, butylidene, heptachlorobutylidene, heptafluorobutylidene, pentylidene, hexylidene, 1,1-cyclohexylidene, 1,4-cyclohexylene, 2-chioro-1,4-cyclohexylene, 2-fluoro-1,4-cyclohexylene, 1,3-cyclohexylene, cyclopentylene, chlorocyclopentylene, fluorocyclopentylene, cycloheptylene, m-phenylene, p-phenylene, 2-chloro-1,4-phenylene, 2-fluoro-1,4-phenylene, o-phenylene, methylphenylene, dimethylphenylene, trimethylphenylene, tetramethylphenylene, 1,4-naphthylene, 3-fluoro-1,4-naphthylene, 5-chloro-1,4-naphthylene, 1,5-naphthylene, or 2,6-naphthylene is a stable divalent radical, such as a difunctional aliphatic, cycloaliphatic, or aromatic radical, in each case having up to 1–13 carbon atoms, or a thio, oxy, carbonyl, sulfinyl, or sulfonyl radical,
x is 0 or 1,
n is 1 or 2, and
any aromatic ring of the polyhydroxylic compound is optionally substituted with at least one atom of chlorine, fluorine, bromine, —CHO, or a carboxyl or acyl radical;
said peroxide curative is present in an amount of 0.05–5 parts per hundred parts by weight of fluoroelastomer, wherein the peroxide curative is alpha,alpha-bis(tert-butylperoxy-isopropyl)benzene or 2,5-dimethyl-2,5-di(t-butyl-peroxy)hexane; and
said monomeric ester plasticizer is present in an amount of 4 to 6 per 100 parts of the fluoroelastomer, and said monomeric ester plasticizer is pentaerythritol ester.

25. A curable fluoroelastomer composition according to claim 1, wherein in preparing said composition, the at least one peroxide curative is dissolved into the monomeric ester plasticizer and then combined with the elastomeric component.

26. A curable fluoroelastomer composition comprising:
an elastomeric component consists of one or more fluoroelastomers,
at least one bisphenol curative,
at least one peroxide curative, and
a monomeric ester plasticizer,
wherein said one or more fluoroelastomers is a homopolymer or a copolymer in which the monomer units are selected from vinylidene fluoride, hexafluoropropylene, tetrafluoroethylene, chlorotrifluorethylene, and perfluoro (alkyl vinyl ether).

27. A curable fluoroelastomer composition comprising:
an elastomeric component consisting essentially of one or more fluoroelastomer,
at least one bisphenol curative,
at least one peroxide curative, and
a monomeric ester plasticizer,
wherein said one or more fluoroelastomers is a homopolymer or a copolymer in which the monomer units are selected from vinylidene fluoride, hexafluoropropylene, chlorotrifluorethylene, and perfluoro (alkyl vinyl ether), and
said at least one bisphenol curative and said at least one peroxide curative provide a curative system which reduces post cure time.

28. A cured molded fluoroelastomer composition obtained by curing under pressure within a mold a fluoroelastomer composition comprising:
an elastomeric component consisting essentially of one or more fluoroelastomers,
at least one bisphenol curative, and
at least one peroxide curative,
wherein said one or more fluoroelastomers is a homopolymer or a copolymer in which the monomer units are selected from vinylidene fluoride, hexafluoropropylene, tetrafluoroethylene, chlorotrifluorethylene, and perfluoro (alkyl vinyl ether).

29. A sealing element comprising a cured fluoroelastomer composition comprising:
an elastomeric component consisting essentially of one or more fluoroelastomers,
at least one bisphenol curative,
at least one peroxide curative, and
a monomeric ester plasticizer,
wherein said one or more fluoroelastomers is a homopolymer or a copolymer in which the monomer units are selected from vinylidene fluoride, hexafluoropropylene, tetrafluoroethylene, chlorotrifluorethylene, and perfluoro (alkyl vinyl ether).

* * * * *